United States Patent
Martini (10) Patent No.: US 10,260,672 B2
(45) Date of Patent: Apr. 16, 2019

(54) METHOD AND APPARATUS FOR SPIN PHOTOGRAPHY

(71) Applicant: Martini Studios LTD., Dublin (IE)

(72) Inventor: Karl Martini, Dublin (IE)

(73) Assignee: Martini Studios LTD., Dublin (IE)

( * ) Notice: Subject to any disclaimer, the term of this patent is extended or adjusted under 35 U.S.C. 154(b) by 4 days.

(21) Appl. No.: 15/536,883

(22) PCT Filed: Dec. 17, 2015

(86) PCT No.: PCT/EP2015/025112
§ 371 (c)(1),
(2) Date: Jun. 16, 2017

(87) PCT Pub. No.: WO2016/096161
PCT Pub. Date: Jun. 23, 2016

(65) Prior Publication Data
US 2017/0363248 A1 Dec. 21, 2017

Related U.S. Application Data

(60) Provisional application No. 62/092,871, filed on Dec. 17, 2014.

(51) Int. Cl.
*F16M 11/08* (2006.01)
*G06T 1/00* (2006.01)
(Continued)

(52) U.S. Cl.
CPC ............. *F16M 11/10* (2013.01); *F16M 11/08* (2013.01); *F16M 11/18* (2013.01); *G03B 15/07* (2013.01);
(Continued)

(58) Field of Classification Search
None
See application file for complete search history.

(56) References Cited

U.S. PATENT DOCUMENTS 8,301,022 B1 * 10/2012 McGuire ............... G03B 15/06
396/2
8,676,045 B1 * 3/2014 Sawatzky ............. G03B 15/07
396/3
(Continued)

FOREIGN PATENT DOCUMENTS

WO 2004100561 A1 11/2004

OTHER PUBLICATIONS

International Search Report and Written Opinion Form PCT/ISA/220, International Application No. PCT/EP2015/025112, p. 1-10, International Filing Date Dec. 17, 2015, dated Mar. 18, 2016.

*Primary Examiner* — Clayton E. LaBalle
*Assistant Examiner* — Linda B Smith
(74) *Attorney, Agent, or Firm* — Bond Schoeneck & King, PLLC; George McGuire (57) ABSTRACT

Provided are a method and system for producing photographic images of an object about multiple axes, the method comprising: suspending the object; rotating the object around a first axis allowing multiple photographic images of the object to be captured about the first axis by an imaging device; and rotating the imaging device about the object around a second axis allowing multiple photographic images of the object to be captured about the second axis by the imaging device.

13 Claims, 10 Drawing Sheets

(51) Int. Cl.
  *F16M 11/10* (2006.01)
  *F16M 11/18* (2006.01)
  *G03B 15/07* (2006.01)
  *G03B 17/56* (2006.01)
  *G03B 37/02* (2006.01)

(52) U.S. Cl.
  CPC ........... *G03B 17/561* (2013.01); *G03B 37/02* (2013.01); *F16M 2200/041* (2013.01); *G06T 1/0007* (2013.01)

(56) References Cited

U.S. PATENT DOCUMENTS

| | | | |
|---|---|---|---|
| 2002/0050988 A1* | 5/2002 | Petrov | G06K 9/20 345/418 |
| 2003/0194229 A1 | 10/2003 | Linden | |
| 2004/0036841 A1 | 2/2004 | Dbjay | |
| 2006/0147188 A1* | 7/2006 | Weng | F16M 11/046 396/5 |
| 2007/0019870 A1* | 1/2007 | Mizoguchi | H04N 1/387 382/233 |
| 2007/0035539 A1 | 2/2007 | Matsumura et al. | |
| 2015/0282714 A1* | 10/2015 | Mueller | A61B 90/30 348/37 |

\* cited by examiner

METHOD AND APPARATUS FOR SPIN PHOTOGRAPHY

CROSS-REFERENCE TO RELATED APPLICATIONS

This application is the U.S. National Stage filing under 35 U.S.C. 371 of international application number PCT/EP2015/025112 filed on Dec. 15, 2015, which in turn claims priority to U.S. Provisional Application No. 62/092,871, filed Dec. 17, 2014, the entire disclosure of each of which is incorporated herein by reference.

FIELD

The present invention is related to spin photography, and in particular to a method and system for producing photographic images of an object about multiple axes.

BACKGROUND OF THE INVENTION

Spin photography involves a process of capturing a series of still object images from multiple viewpoints. The images can then be collated, edited, formatted and integrated with a viewer that allows a customer to interact with the object, rotating it from various angles and zooming into it to see details of the object. With spin photography, the online buyer can be presented with an almost tactile shopping experience.

Viewing images of an object or product from multiple viewpoints allows the consumer to see detailed product features from all sides and up close. Spin photography provides the online buyer the opportunity to determine whether they want to purchase a product or not. Furthermore, 360 degree product images allows the consumer to view the product in detail and to ensure they are buying the right product, which leads to reduced returns. Products displayed in 360 degrees will have a better chance of being purchased. Consumers can interact with the product as if they were in a store but with the advantage of having each product lit, shot and touched-up by a trained photographic professional in a studio environment. Almost anything can be photographed using a spin photography method; from simple products like shoes, to fine-art sculptures and fashion using live models.

Generally, spin photography comprises photographing an object while the object is rotated on a turntable. Most conventional spin photography techniques utilise turntables which is the standard way to produce product spins. A turntable can be used to rotate the object while the object is supported on or suspended from the turntable, or the camera can be rotated by a turntable. Such a technique is disclosed for example in JP2005338977. This technique uses a camera rotated by a turntable around the subject. In particular, an articulating arm camera mount for mounting an imaging device is provided. The camera mount comprises a base, one or more arms, and a head that are movably secured to one another and are generally interchangeable with different components and pieces. The camera mount allows for greater flexibility and creativity in the placement and positioning of an imaging device such as a camera.

Another way of rendering multi-axis images of an object involves using computer generated imagery (CGI). However, photography is better at showing elements such as texture, reflectivity and true colour rendition. Photography is also considerably cheaper than CGI and gives a more honest representation of the product because it IS the product. This gives the buyer of a product much more confidence. The fact that CGI is rarely, if ever used for e-commerce and spin photography speaks volumes.

SUMMARY

According to the present disclosure there is provided a method as detailed in claim 1. Also provided is a system as detailed in claim 10. Advantageous features are claimed in the dependent claims.

BRIEF DESCRIPTION OF THE DRAWINGS

The present application will now be described with reference to the accompanying drawings in which.

DETAILED DESCRIPTION OF THE DRAWINGS

The present disclosure provides a method and system for producing photographic images of an object about multiple axes.

The method comprises suspending the object; rotating the object around a first axis allowing multiple photographic images of the object to be captured about the first axis by an imaging device; and rotating the imaging device about the object around a second axis allowing multiple photographic images of the object to be captured about the second axis by the imaging device. The second axis may be perpendicular to the first axis.

Figure 1:
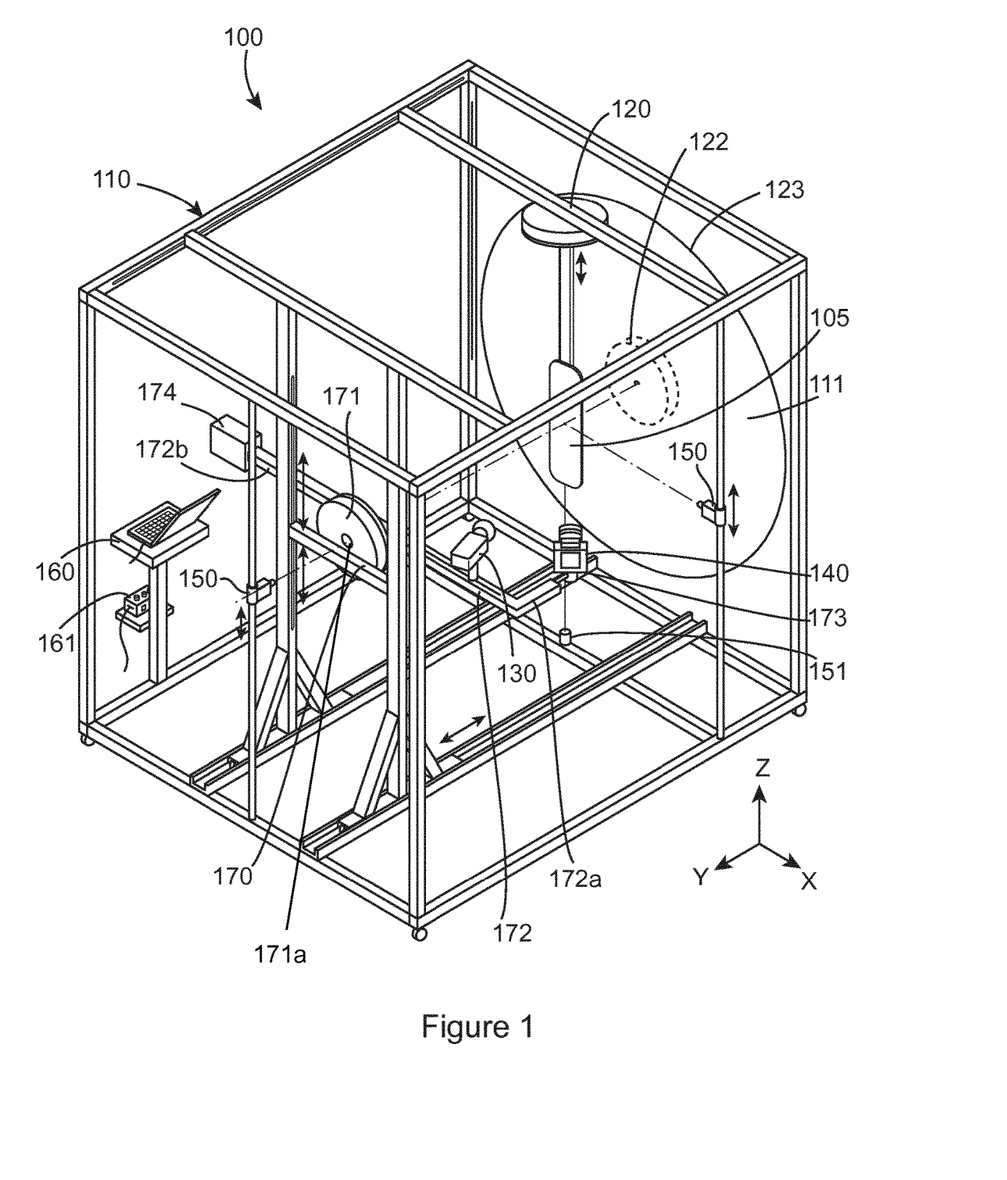
FIG. 1 is a perspective view illustrating a system for producing photographic images of an object about multiple axes, according to an embodiment of the present disclosure.

FIG. 1 is a perspective view illustrating a system 100 for producing photographic images of an object about multiple axes, according to an embodiment of the present disclosure. Referring to FIG. 1, the system 100 comprises a frame 110 for supporting components of the system 100, an overhead turntable 120 for rotating an object 105 to be photographed, at least one lighting element 130 for lighting the object 105, an imaging device 140 for photographing the object, and one or more alignment devices 150 for aligning the object 105 with the imaging device 140 and/or the overhead turntable 120, and a workstation 160 for processing images captured by the imaging device 140. For purposes of explanation, an X-axis, Y-axis and Z-axis are shown for reference. The X-axis, Y-axis and Z-axis are perpendicular to each other. The workstation 160 may be disposed at a side of the system 100. The imaging device 140 may be any suitable high-resolution camera used for spin photography. The system 100 may also comprise a controller 161 for controlling operations of the components of the system 100. The controller 161 may be a standalone device or may be integrated into the workstation 160.

The system 100 may also comprise an articulating arm mechanism 170 for mounting and rotating the imaging device 140. Referring to FIG. 1, the articulating arm mechanism 170 comprises an imaging device turntable 171 configured to be mounted on a receiving surface of the frame 110; an imaging device arm 172 movably secured to the imaging device turntable 171 such that the imaging device arm 172 can be rotated by the imaging device turntable 171 and secured in place; and a mount head 173 movably secured to the imaging device arm 172 such that the mount head 173 can be moved relative to the imaging device arm 172 and secured in place. The mount head 173 is configured to mount the imaging device 140. The mount head 173 may be configured to allow the imaging device 140 multiple degrees of freedom about the mount head 173.

Referring to FIG. 1, the imaging device arm 172 may comprise an imaging device end 172a and a counterweight end 172b. The imaging device end 172a refers to the end of the imaging device arm 172 at which the imaging device 140 is disposed. The counterweight end 172b refers to the end of the imaging device arm 172 at which a counterweight 174 is disposed. The counterweight 174 is provided to counter the weight of the imaging device 140 at the other end of the imaging device arm 172 while the imaging device arm 172 rotates. The imaging device end 172a may be configured to project from a main body of the imaging device arm 172. For example, as illustrated in FIG. 1, the imaging device end 172a may project perpendicularly from the end of the main body of the imaging device arm 172. Such configuration allows the imaging device 140 to be positioned closer to the object 105 being photographed.

Figure 2:
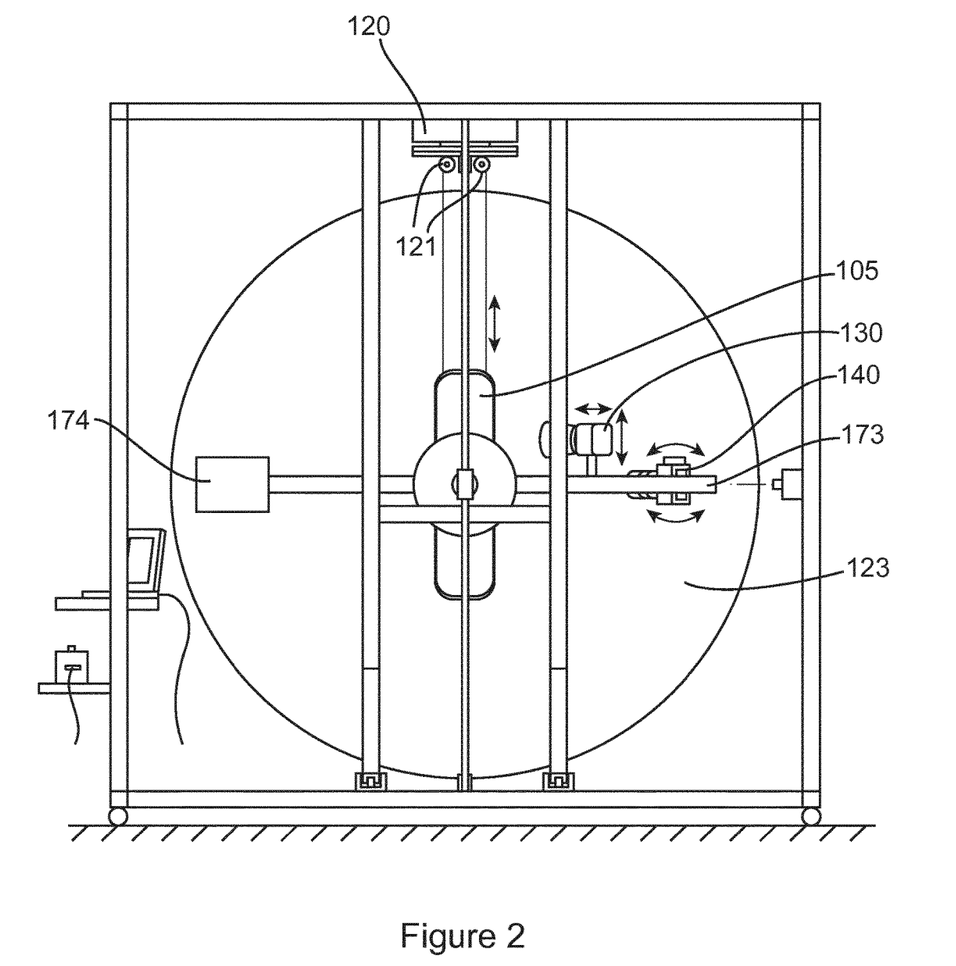
FIG. 2 is a rear view of the system of FIG. 1, according to an embodiment of the present disclosure.
Figure 3:
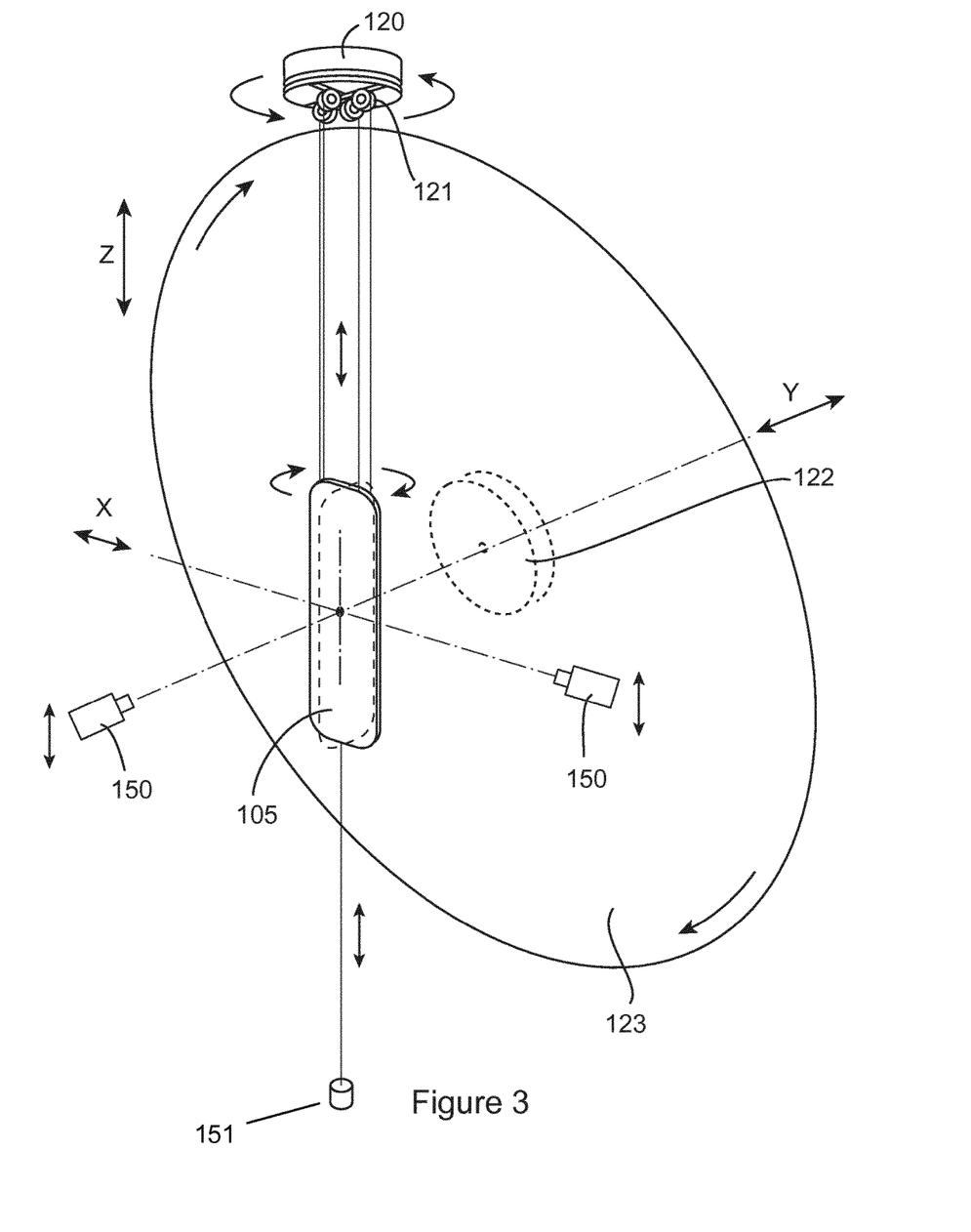
FIG. 3 is a perspective view of an object to be photographed being suspended from a turntable of the system of FIGS. 1 and 2.

FIG. 2 is a rear view of the system of FIG. 1, according to an embodiment of the present disclosure. FIG. 3 is a perspective view of an object 105 to be photographed being suspended from the overhead turntable 120. In the system 100 of the present disclosure, the overhead turntable 120 is disposed on an upper part of the frame 110. It will be understood therefore that objects to be photographed can be suspended from the overhead turntable 120 in mid-air and rotated by the overhead turntable 120. Referring to FIGS. 2 and 3, the object 105 may be suspended from the overhead turntable 120 using any suitable suspension means. For example, the object 105 may be suspended from the overhead turntable 120 using a fine cord or thread such as fishing line attached to an adjustable spool 121. The object 105 may be suspended using one or more suspension lines attached to various points of the object 105. Referring to FIG. 3, the overhead turntable 120 may comprise one or more adjustable spools 121 for sliding along rails on the overhead turntable 120. The one or more suspension lines are suspended from the one or more adjustable spools 121. A centre point of the object 105 may be measured and marked if necessary. The mark can be removed in post-processing or before shooting begins. The object 105 may be centred by adjusting the one or more adjustable spools 121. It will be understood that the one or more suspension lines may be used to adjust the height, alignment and tension of the object 105. A greater number of suspension lines provides increased stabilisation and less wobbling of the object 105. An anchoring weight 151 may be provided to further stabilise and centre the object 105 as it spins. For example, as illustrated in FIG. 1, the anchoring weight 151 may be suspended from a line or thread attached to the object 105. As illustrated in FIG. 2, the overhead turntable 120 may be configured so that the height of the object 105 may be adjusted in the Z-axis. Also, the overhead turntable 120 may be configured to rotate at various RPMs according to requirements. Referring to FIG. 1, the imaging device turntable 171 may be configured to define an aperture 171a therein through which a data cable between the imaging device 140 and workstation 160 can be run. This is known as 'shooting tethered' in the photography industry. A power cable for a flash may also be run through the aperture 171a. The imaging device may communicate with the flash via a synchronisation cable or using any commercially available wireless device. The purpose of the apertured configuration of the imaging device turntable 171 is so that cables do not get wrapped up in the imaging device arm 172 as it rotates. Another reason for having an aperture 171a in the imaging device turntable 171 is so that the alignment device 150 to the front of the object can point through the aperture 171a and onto the object 105 for centering. In other embodiments, a data cable may not be required, and a memory card from the imaging device 140 may be inserted into the workstation 160 after the shooting is complete. In other embodiments, a power cable may not be required for the flash if the flash is powered by batteries.

Referring to FIG. 1, the object 105 may be suspended in a front part of the system 100 against a background. That is, when the imaging device 140 captures images of the object 105, the background appears behind the object 106 in the captured images. The background may comprise a rotatable background 123. The system 100 may further comprise a background turntable 122 for rotating the rotatable background 123. The rotatable background 123 may be positioned adjacent to the object 105. The background turntable 122 may be configured to rotate the rotatable background 123 in the Y-axis at the same speed in correspondence with the rotation of the imaging device 140 in the Y-axis. The rotatable background 123 may have any kind of colour, pattern or texture, for example, teak decking of a fancy yacht in order to give a deck shoe some context. Another example is to configure the rotatable background 123 with fake snow so a snowboard looks as if it were shot on the slopes in the Alps. The rotatable background 123 may be configured to rotate in unison with the imaging device 140. Once the rotatable background 123 rotates at the same speed as the imaging device 140 on the imaging device arm 172 and the object 105 remains stationary (and all other visual points of reference are removed and the resultant images are rotated 90 degrees in post-processing) it will look like the object 105 is hovering over the rotatable background 123. In this arrangement, the stationary object 105 will be positioned between the rotating imaging device 140 and the rotating background 123. In other embodiments, the object 105 may rotate while both the rotatable background 123 and the imaging device 140 rotate, thus providing a triple-axis spin.

Referring to FIG. 2, the mount head 173 may be configured to allow the imaging device 140 movement in a plurality of axes about the mount head 173. Also, the at least one lighting element 130 may be configured to have ranges of movement in at least two axes. For example, the at least one lighting element 130 may be configured to slide along the imaging device arm 172 and fixed at any point thereon. The at least one lighting element 130 may also be configured to direct light at the object at various angles with respect to the Z-axis as depicted in FIG. 1.

Referring to FIG. 3, the system 100 may comprise one or more alignment devices 150. In the embodiment of FIG. 3, two alignment devices 150 are used, one in each of the X and Y-axes. As illustrated in FIG. 1, an alignment device 150 for each of the X and Y-axes may be disposed on an outer beam of the frame 110. The alignment devices 150 for the X and Y-axes may be configured to align the centre of the object 105 with a centre of both the overhead turntable 120 and a centre of the imaging device arm 172. Accordingly, the alignment devices 150 for the X and Y-axes may be configured to be adjusted in the Z-axis direction, as illustrated in FIG. 1. The object 105 may be aligned in two axes, the X-axis and Y-axis as depicted in FIG. 3. Good alignment is essential to produce a wobble-free spin. Each of the alignment devices 150 may comprise a laser device such as a plumb laser. As is known in the art, a plumb laser is a device that draws a perfectly plumb line on whatever it is pointing at.

Figure 4:
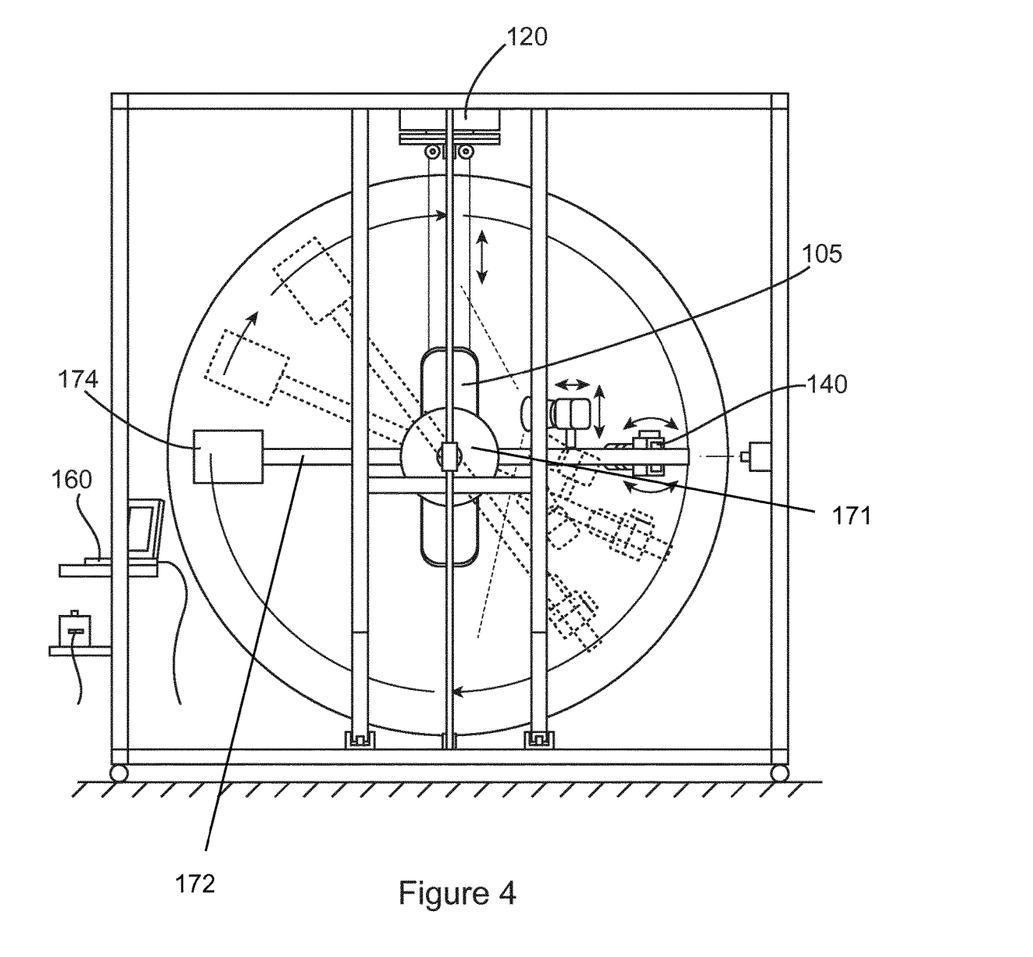
FIG. 4 is a rear view of the system of FIG. 1, illustrating the range of movement of an imaging device of the system, according to an embodiment of the present disclosure.

FIG. 4 is a rear view of the system 100 of FIG. 1, illustrating the range of movement of the imaging device 140, according to an embodiment of the present disclosure. Referring to FIG. 4, the imaging device arm 172 is configured to be rotated 360 degrees about the Y-axis by the imaging device turntable 171. Referring to FIGS. 1 and 4, the imaging device arm 172 may be located in a rear section of the system 100 so as to be rotated freely by the imaging device turntable 171 without contacting the object 105 located towards the front of the system 100.

Figure 5:
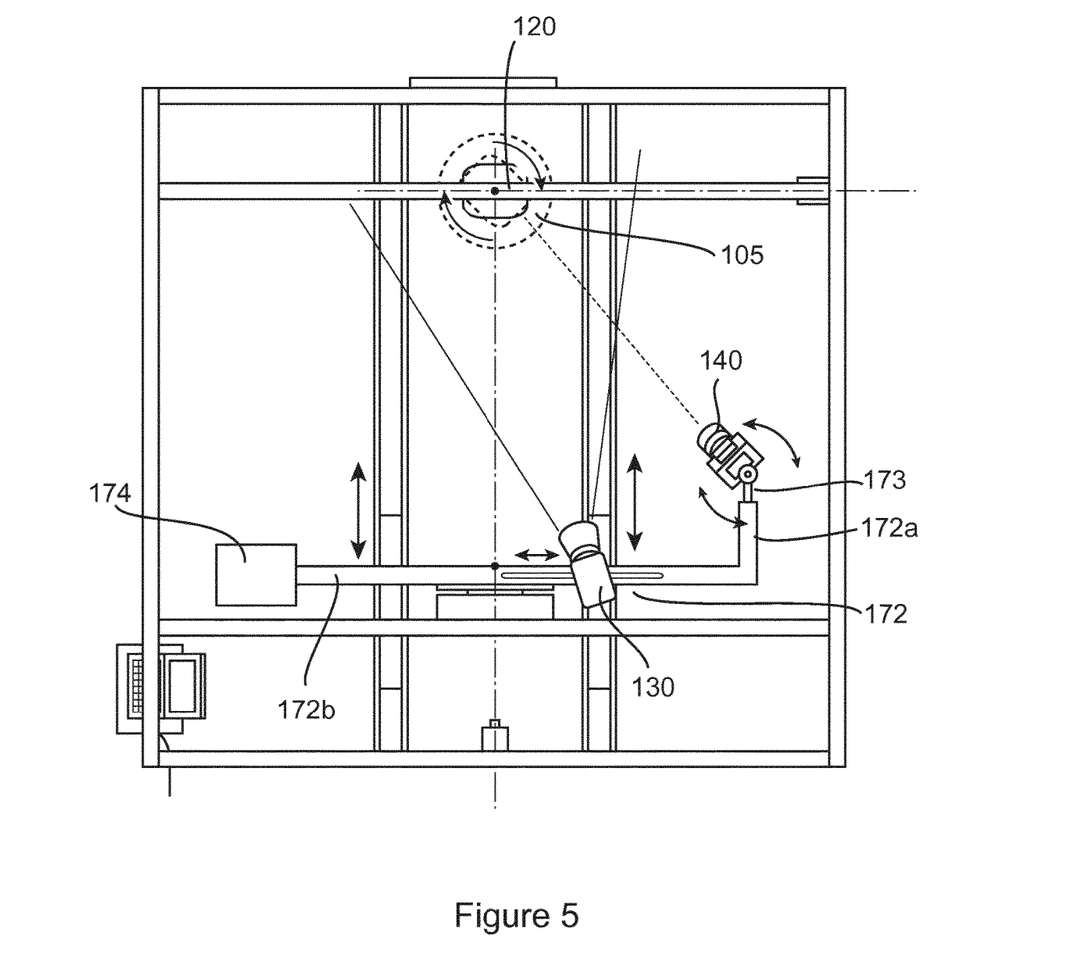
FIG. 5 is a top plan view of the system of FIG. 1, illustrating the range of movement of the imaging device of the system and the set-up of a lighting device, according to an embodiment of the present disclosure.

FIG. 5 is a top plan view of the system of FIG. 1, illustrating the range of movement of the imaging device 140 of the system 100 and the set-up of a lighting element 130, according to an embodiment of the present disclosure. As explained previously, the imaging device end 172a may project perpendicularly from the end of the main body of the imaging device arm 172. Such configuration allows the imaging device 140 to be positioned closer to the object 105 being photographed. In this regard, the mount head 173 may be configured to have a telescopic functionality in order to adjustably project and retract along the Y-axis as depicted in FIG. 1. Thus, the imaging device 140 may be positioned closer to or farther away from object 105 as required. FIG. 5 also illustrates a lighting element 130 for lighting the object 105 to be photographed. The lighting element 130 may be located on the main body of the imaging device arm 172. When the object 105 is rotated by the overhead turntable 120, the lighting element 130 is positioned to illuminate the object 105 suitably. Also, as the lighting element 130 is disposed on the imaging device arm 172, the lighting element 130 is configured to rotate with the imaging device 140. As illustrated in FIG. 5, the lighting element 130 is configured to be adjusted in one or more axes on the imaging device arm 172 in order that objects of different sizes and shapes can be sufficiently illuminated and the light can be directed at the object.

Referring to FIG. 1, the imaging device arm 172, the imaging device 140, and the at least one lighting device 130 may be configured to be adjustable in the Y-axis direction so as to be moved closer or further away from the object 105. This arrangement is known as a 'dolly' in the film and photography industry. The arrangement may be slid forward or backward. The reason for this capability is to provide a choice as to how shallow or deep and what angle is used when photographing an object 105. This is useful for accommodating larger or smaller objects.

With reference to FIGS. 1 to 5, a method for producing photographic images according to an embodiment of the present disclosure may comprise: suspending the object 105; rotating the object 105 in the Z-axis allowing multiple photographic images of the object 105 to be captured about the Z-axis by the imaging device 140; and rotating the imaging device 140 about the object 105 around the Y-axis allowing multiple photographic images of the object 105 to be captured about the Y-axis by the imaging device 140. The overhead turntable 120 may be configured to communicate with the imaging device 140 so that the imaging device 140 captures images at discrete time and/or angular displacements.

The imaging device 140 may be configured to remain stationary while rotating the object 105 about the Z-axis allowing multiple photographic images of the object 105 to be captured about the Z-axis by the imaging device 140. For example, 36 images may be captured by the imaging device 140 about the Z-axis in a complete 360 degree spin, that is one image captured every 10 degrees rotation.

Following the capturing of multiple photographic images of the object 105 about the Z-axis, the object 105 may be configured to remain stationary while rotating the imaging device 140 about the object 105 about the Y-axis allowing multiple photographic images of the object 105 to be captured about the Y-axis by the imaging device 140. For example, 36 images may be captured by the imaging device 140 about the Y-axis in a complete 360 degree spin, that is one image captured every 10 degrees rotation. The imaging device 171 turntable may also be configured to communicate with the imaging device 140 for shutter release/flash firing.

Alternatively, it will be understood that the method may comprise first capturing images about the Y-axis by rotating the imaging device 140 about the Y-axis while the object 105 is stationary, followed by capturing images about the Z-axis by rotating the object 105 about the Z-axis while the imaging device 140 is stationary. As mentioned previously, the X-axis, Y-axis, and Z-axis may be perpendicular to each other.

In another embodiment, the method may comprise capturing photographic images while rotating both the object 105 and the imaging device 140 simultaneously. Accordingly, it will be understood that by spinning both the object 105 and the imaging device 140 simultaneously, a triple-axis spin is achieved. A triple-axis spin is also achieved when the background 123, the object 105 and the imaging device 140 are rotated simultaneously.

The captured photographic images may be post-processed at the workstation 160. That is, the images may be edited and formatted with suitable photo-editing software at the workstation 160. As the object 105 is suspended from the overhead turntable 120 during the photographing operations, the suspension lines used to suspend the object 105 need to be removed in post-processing. As the object 105 is suspended against an upright background, a shadow is created on the background by the object 105. In post-processing, resultant images may be rotated 90 degrees, and this background then becomes the 'floor'. After the suspension line(s) are removed and there are no points of reference other than the object, background and the shadow, the optical illusion is complete and the object appears to 'hover' over a surface. The edited images may be uploaded to a website for viewing. For example, the images may be integrated with a viewer that allows a consumer to interact with the object, rotating it on various axes and zooming into it to see the object detail. For example, by capturing a series of photographic images in both the X and Y axes, for example 36 images for a 360 degree spin on each axis, the X-axis images and then the Y-axis images, can be displayed in succession. Alternatively, by capturing a series of photographic images while both the object and camera are rotating, the images presented may appear in a third axis.

Figure 6:
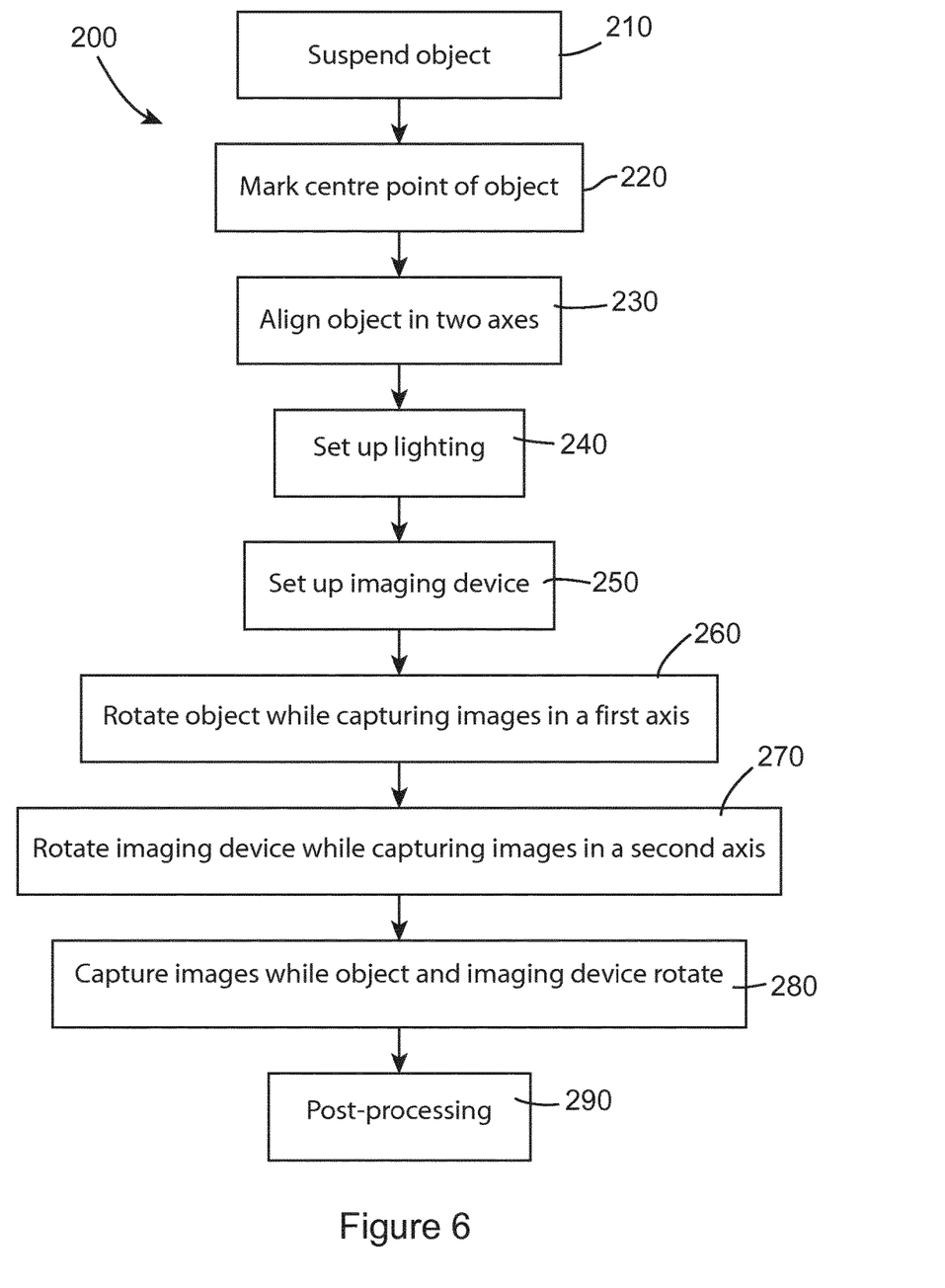
FIG. 6 is a flowchart illustrating a method for producing photographic images of an object about multiple axes, according to an embodiment of the present disclosure.

FIG. 6 is a flowchart illustrating a method 200 for producing photographic images of an object about multiple axes, according to an embodiment of the present disclosure. The method 200 may be performed by the system 100 illustrated in FIGS. 1 to 5. Referring to FIG. 6, the method 200 comprises one or more of the following steps: suspending an object from the turntable 210, marking the centre point of the object 220, aligning the object in two axes 230, setting up the lighting of the object 240, setting up the imaging device 250, rotating the object to capture photographic images about a first axis 260, rotating the imaging device arm to capture photographic images about a second axis 270, capturing photographic images while rotating both the object and the imaging device 280, and performing post-processing operations on the captured images using the workstation 290.

As mentioned above, the method may also comprise rotating a contextualised background at the same speed and in the same axis as the imaging device.

Figure 7:
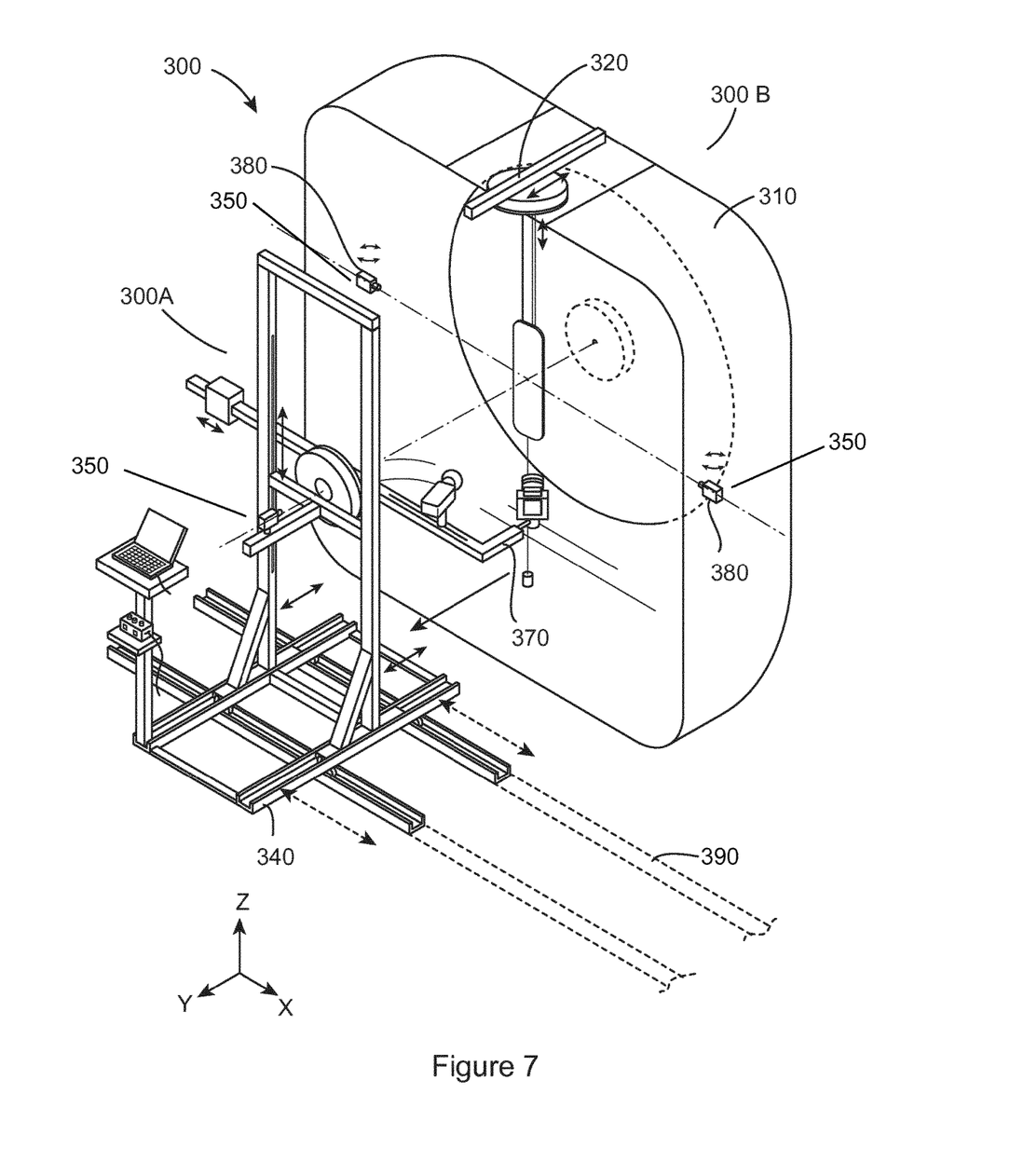
FIG. 7 is a perspective view of a system with an imaging apparatus located separate from a module comprising a cyclorama wall and an overhead turntable, according to an embodiment of the present disclosure.
Figure 8:
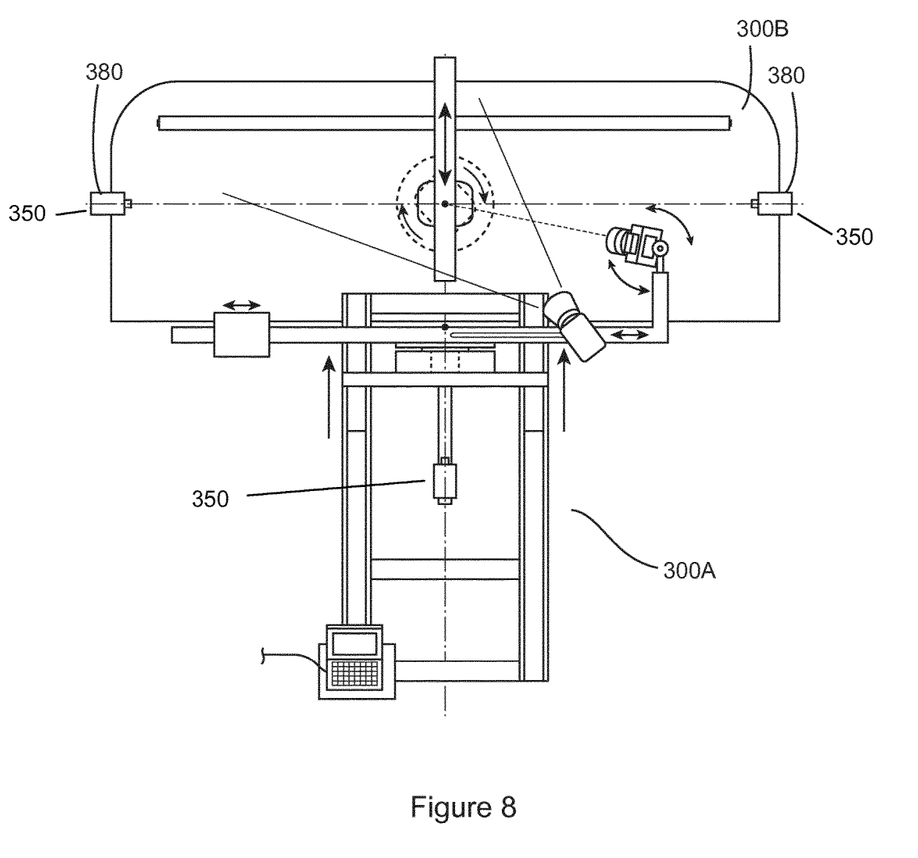
FIG. 8 is a top plan view of the system of FIG. 7.

The system of FIGS. 1 to 5 provides an integrated system with turntable and imaging device housed within a frame. In another embodiment, the present disclosure provides a system for producing photographic images of an object about multiple axes, the system comprising an imaging apparatus located separate from a module comprising a background wall and an overhead turntable. In this regard, FIG. 7 is a perspective view of a system 300 with an imaging apparatus 300A located separate from a module 300B comprising a background wall 310 and a Z-axis overhead turntable 320. The imaging apparatus 300A is moveable in relation to the module 300B. The background wall may comprise a cyclorama wall. A cyclorama wall, also known as a 'cyc wall' or 'infinity wall' is a concave wall or background used in photographic studios with curved edges so that no corners are visible in a photograph. In this instance the curves are on both the sides and top and bottom to accommodate the nature and positioning of the imaging apparatus 300A. This results in something with the appearance of an upturned pudding bowl and hereinafter may be referred to as a 'booth'. The Z-axis overhead turntable 320 may be disposed in a top portion of the background wall 310. Objects to be photographed within the booth may be suspended from the Z-axis overhead turntable 320. FIG. 8 is a top plan view of the system of FIG. 7. The imaging apparatus 300A may be configured to be disposed in front of the module 300B. The imaging apparatus 300A may be configured to be moved in and out of the module 300B along the Y-axis. That is, the imaging apparatus 300A may be configured to be moved in and out of the space defined by the concave nature of the module 300B.

Figure 9:
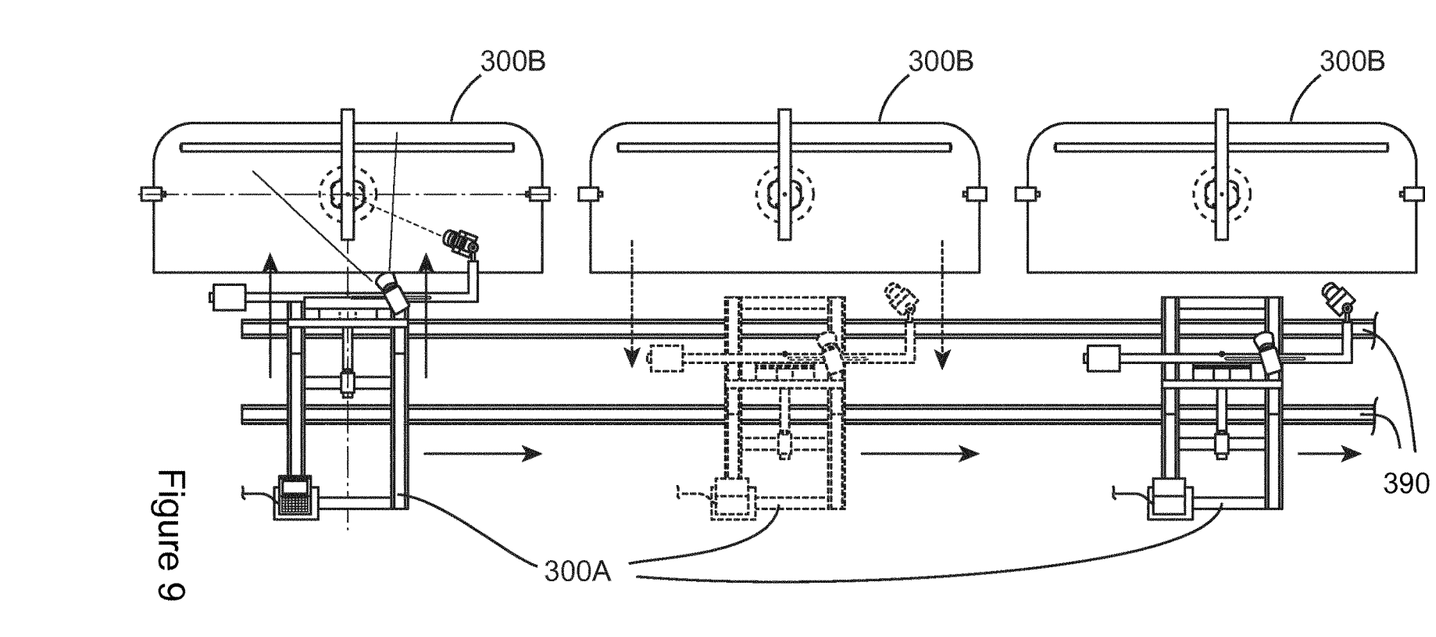
FIG. 9 illustrates a system with a plurality of modules arranged in series, each with its own cyclorama wall and overhead turntable, according to an embodiment of the present disclosure.

In another embodiment, a plurality of modules 300B may be arranged in series, each with its own background wall 310 and Z-axis overhead turntable 320, as illustrated in FIG. 9. As shown in FIG. 9, the plurality of modules 300B may be arranged in a row side by side or end to end. Thus, it can be seen that the plurality of modules 300B may be arranged in a row such that a technician can be working on hanging an object in one module 300B while the imaging apparatus 300A is photographing another object in another module 300B. It will be understood by the skilled person that the imaging apparatus 300A comprises an articulating arm mechanism 370 as described above in relation to FIG. 1. That is, the articulating arm mechanism 370 corresponds to the articulating arm mechanism 170 of FIG. 1. Each of the modules 300B is configured to remain static. Referring to FIG. 7, the imaging apparatus 300A is configured to be mobile and travel along tracks 390 so that it may 'visit' each module 300B. The tracks 390 may extend along the X axis such that the imaging apparatus 300A will always be parallel to the modules 300B, regardless of the module 300B being visited. In order for the articulating arm mechanism 370 on which the camera is mounted to clear the walls of the modules 300B while it is being moved between modules 300B, the imaging apparatus 300A may be configured to move in and out of each module 300B along the Y axis such that the imaging apparatus 300A is able to 'park' in each module 300B. This may be achieved with tracks 340 along the Y-axis of the imaging apparatus 300A, as illustrated in FIGS. 7 and 9.

When photographing different-sized objects, the gap between the object and background may be changed such that the object can be rotated around the Z axis without the object either hitting the background or being too far from the background. To accommodate this, the overhead Z axis turntable 320 in each module 300B may be configured to hang from an overhead rail and be moveable along the Y axis so that it can be adjusted to accommodate objects of varying size.

During production, an extra alignment device such as a laser may be utilised in order to centre the object during photography. In this embodiment with the multiple modules configuration, referring to FIGS. 7 and 8, an aperture 380 may be provided in each of the left and right walls of each module 300B where an alignment device 350 can be placed and directed at the object. The alignment devices 350 may be configured to be swivelled about the Z axis so that they point at the centre point of the overhead turntable 320 wherever it is placed on the Y axis using the overhead rails. Thus, in the embodiment illustrated in FIGS. 7 to 9, three alignment device 350s may be used, one disposed on the imaging apparatus 300A to the front of the object, and one in each side of the background wall of the module 300B.

The workstation 160 may include various hardware and software components that function to perform the post-processing operations described above. For example, the workstation 160 may comprise a user interface, a processor in communication with a memory, and a communication interface. The processor functions to execute software instructions that can be loaded and stored in the memory. The processor may include a number of processors, a multi-processor core, or some other type of processor, depending on the particular implementation. The memory may be accessible by the processor, thereby enabling the processor to receive and execute instructions stored on the memory. The memory may be, for example, a random access memory (RAM) or any other suitable volatile or non-volatile computer readable storage medium. In addition, the memory may be fixed or removable and may contain one or more components or devices such as a hard drive, a flash memory, a rewritable optical disk, a rewritable magnetic tape, or some combination of the above.

One or more software modules may be encoded in the memory. The software modules may comprise one or more software programs or applications having computer program code or a set of instructions configured to be executed by the processor. Such computer program code or instructions for carrying out operations for aspects of the post-processing methods disclosed herein may be written in any combination of one or more programming languages.

The software modules may include various editing, formatting and collation functionalities configured to be executed by the processor. During execution of the software modules, the processor configures the workstation 160 to perform various operations relating to the post-processing methods described above.

Other information and/or data relevant to operations of the present disclosure, such as a database, may also be stored on the memory. The database may contain and/or maintain various data items and elements that are utilized throughout the various operations of the system described above. Such elements may be located on a remote device or server—not shown, and connected to the workstation 160 through a network in a manner known to those skilled in the art, in order to be loaded into a processor and executed.

The communication interface is also operatively connected to the processor and may be any interface that enables communication between the workstation 160 and external devices. The communication interface may be configured for transmitting and/or receiving data such as edited images. For example, the communication interface may include but is not limited to a Bluetooth, or cellular transceiver, a satellite communication transmitter/receiver, an optical port and/or any other such, interfaces for wirelessly connecting the workstation 160 to other devices.

The user interface is also operatively connected to the processor 120. The user interface may comprise one or more input device(s) such as switch(es), button(s), key(s), and a touchscreen.

A display may also be operatively connected to the processor. The display may include a screen or any other such presentation device that enables the user to view various options, parameters, and results. The display may be a digital display such as an LED display. The user interface and the display may be integrated into a touch screen display.

The operation of the workstation 160 and its various elements and components described above will be understood by those skilled in the art with reference to the method and system according to the present disclosure.

The present disclosure provides a method and system for producing photographic images of an object about multiple axes. By obviating the need to place the object on a platform, the method and system of the present disclosure is able to show the underside of the object.

The system combines both spinning the object to be photographed and spinning a camera around the object. The object can be rotated while the camera remains stationary, or the object can be configured to be stationary while the camera is configured to be rotated about the object. In a further embodiment, by spinning both the product and camera simultaneously, a triple axis spin is achieved. It is also possible to shoot a triple axis spin where the object and background turntables and the camera are rotating.

The present disclosure provides a method of displaying object images in two axes. Typically, a hosting engine delivers each axis as either a row or a column. A left/right mouse action displays the 'row' images in succession so the object spins on the Z-axis. Conversely, an up/down mouse action displays the 'column' images and spins the object on the X-axis. This method is inefficient because in order for the product to appear to spin smoothly on either axis and without it 'jumping' when the axis is changed, there must be a photograph to represent every point on both axes. For example this would mean 36 photographs in the Z-axis to represent the row multiplied by 36 images in the Y-axis to represent the column. This results in 1296 images. This is unrealistic because of the time and cost needed to produce that many images and also the bandwidth overhead needed to deliver same. This has resulted in a compromise whereby the number of images in one or both axes is reduced considerably. This results in a 'jerky' spin that does not appear smooth.

According to an embodiment of the present disclosure, by capturing a series of photographic images in both the X and Y-axes, for example 36 images for a 360 degree spin on each axis, the X-axis images and then the Y-axis images can be displayed in succession. In this example, 72 images may be captured when both axes of 36 shots are combined in succession. Where the X and Y-axes join up there will be 2 pairs of identical images and the redundant images may be dropped, thus resulting in a spin with 70 images.

Figure 10:
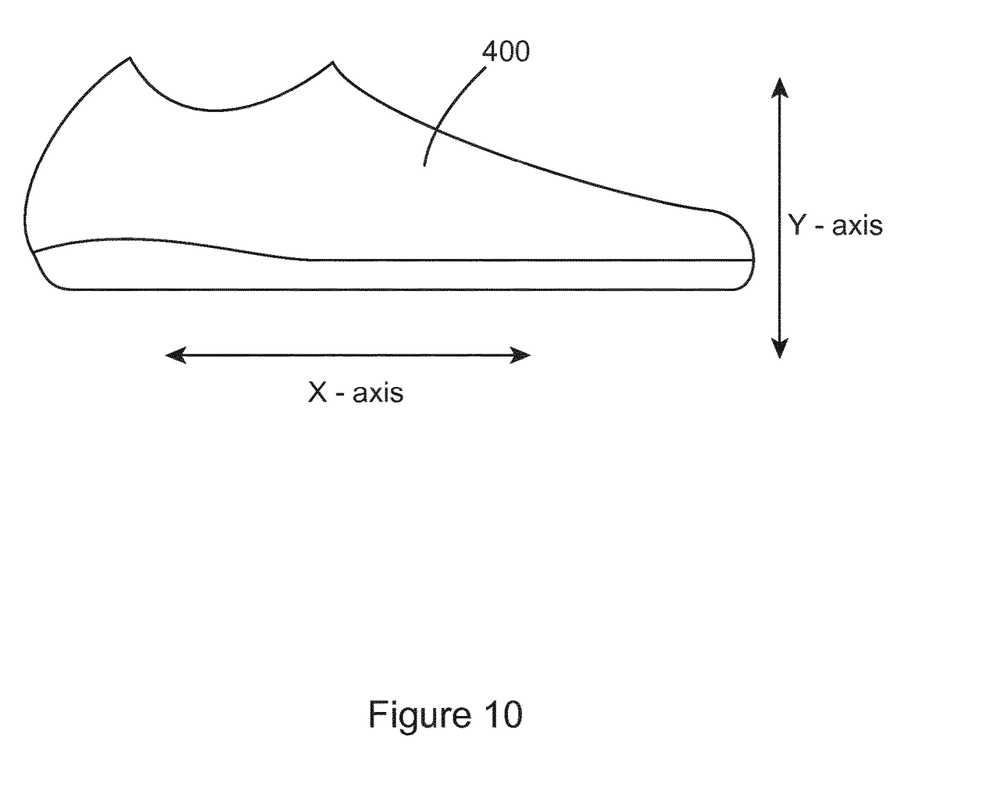
FIG. 10 illustrates a method of presenting X-axis images and then Y-axis images of an object in succession, according to an embodiment of the present disclosure.

In this embodiment, the hosting engine presents all the images representing both axes as one linear series of images. A video may be generated of all the still X-axis images displayed in succession and then all the still Y-axis images displayed in succession. The hosting engine presents all the images representing both axes as one linear series of images. For example, 36 images may be shown on the X axis followed by 36 images on the Y axis for a total of 72 images. The axis change occurs midway through the series. The hosting engine does not manage the axis change and may be ignorant of there being an axis change at all. The hosting engine may display a video where the start and end of the video containing the images are in a loop. The hosting engine may either play the video forward with a left or up mouse action or in reverse with a right or down mouse action, as illustrated in FIG. 10. Referring to FIG. 10, an object 400 is illustrated, in this example a shoe. By moving the mouse horizontally in the X axis, i.e. right or left, a video containing images of the object 400 is played forward or in reverse, respectively. Further, by moving the mouse vertically in the Y axis, i.e., up or down, the video containing images of the object 400 is played forward or in reverse, respectively. If the viewer wishes to switch axis they need only play the video forward or backward with mouse actions until the axis switches when it reaches that point in the video. This creates the illusion with the viewer that they are interacting with the object. It also solves the issue of having to have over hundreds or thousands of images to represent every angle whilst maintaining the smoothness of the spin. As mentioned above, if the viewer wishes to switch axis they need only play the video forward or backward with mouse actions until the axis switches when it reaches that point in the video. This removes any possibility of the spin appearing to 'jump' between axes.

For the purposes of accommodating touch screen devices such as smart-phones and tablet devices, the phrase 'mouse action' can also mean a swipe action used with one's finger.

The system may comprise one or more alignment devices such as lasers. For example, one laser may be positioned in front of the object. One laser may be positioned at one or both sides of the object. In the embodiment illustrated in FIGS. 7 to 9, three lasers may be utilised, one to the front of the object, and one in each side of the background wall. The lasers may be plumb lasers that draw a perfectly plumb line. Plumb lasers draw a perfectly plumb horizontal and vertical line such that they project an X on whatever they are pointing at. Each laser aligns the centre of the object with the centre of both the overhead turntable and the centre of the imaging device arm. Good alignment is essential to produce a wobble-free spin.

In summary, the method and system of the present disclosure achieves a true multi-axis 3D product spin without the photographer having to touch the object OR the camera once shooting commences. This saves a great deal of time and reduces production costs considerably. It also saves money by needing a less-skilled operator/photographer.

The words comprises/comprising when used in this specification are to specify the presence of stated features, integers, steps or components but does not preclude the presence or addition of one or more other features, integers, steps, components or groups thereof.

The invention claimed is:

1. A system for producing photographic images of an object about multiple axes, the system comprising:
    an overhead turntable for suspending the object and rotating the suspended object about a first axis allowing multiple photographic images of the object to be captured about the first axis by an imaging device, whereby the suspended object can be rotated at least partially about the first axis; and
    an imaging device configured to rotate about a second axis different to the first axis allowing multiple photographic images of the suspended object to be captured about the second axis by the imaging device, whereby the imaging device can be rotated at least partially about the second axis, the system further comprising an imaging apparatus and a module,
    the imaging apparatus comprising the imaging device,
    the module comprising the overhead turntable and a background wall, wherein the imaging apparatus is disposed in front of the module and configured to be moved in and out of the module along a first axis; and wherein
    the system further comprises
    three alignment devices, one disposed on the imaging apparatus to the front of the object, and one in each side of the background wall.

2. The system of claim 1, comprising an articulating arm mechanism for mounting and rotating the imaging device.

3. The system of claim 1, comprising at least two alignment devices for aligning the object in two axes.

4. The system of claim 1, further comprising a rotatable background and a background turntable for rotating the rotatable background.

5. The system of claim 1, wherein the background wall comprises a cyclorama wall.

6. The system of claim 1, comprising a plurality of modules arranged in series, each with its own background wall and overhead turntable.

7. The system of claim 1, wherein the suspended object is adapted to rotate in a complete 360 degree spin and the imaging device is adapted to rotate in a complete 360 degree spin.

8. The system of claim 2, wherein the articulating arm mechanism comprises:
    an imaging device turntable;
    an imaging device arm for mounting and rotating the imaging device, the imaging device arm being configured to be movably secured to the imaging device turntable such that the imaging device arm can be rotated by the imaging device turntable; and
    a mount head movably secured to the imaging device arm such that the mount head can be moved relative to the imaging device arm, wherein the mount head is configured to mount the imaging device.

9. The system of claim 3, comprising an alignment device for aligning a centre of the object with a centre of the overhead turntable and an alignment device for aligning a centre of the object with a centre of an imaging device arm for mounting and rotating the imaging device.

10. The system of claim 3, wherein each of the alignment devices comprises a laser.

11. The system of claim 4, wherein the background turntable is configured to rotate the background at the same speed and about the same second axis as the imaging device.

12. The system of claim 6, wherein the plurality of modules are arranged side by side.

13. The system of claim 6, wherein the imaging apparatus is configured to be moveable in parallel to the modules along a second axis perpendicular to the first axis such that the imaging apparatus can visit each module.

* * * * *